(12) United States Patent
Sapugay et al.

(10) Patent No.: US 11,023,951 B2
(45) Date of Patent: Jun. 1, 2021

(54) SYSTEMS AND METHODS FOR MARKETPLACE CATALOGUE POPULATION

(71) Applicant: Paymentus Corporation, Charlotte, NC (US)

(72) Inventors: Edwin Vito Sapugay, Foster City, CA (US); Srinivas Satyasai Sunkara, Sunnyvale, CA (US)

(73) Assignee: PAYMENTUS CORPORATION, Charlotte, NC (US)

( * ) Notice: Subject to any disclaimer, the term of this patent is extended or adjusted under 35 U.S.C. 154(b) by 0 days.

(21) Appl. No.: 16/536,920

(22) Filed: Aug. 9, 2019

(65) Prior Publication Data

US 2019/0362412 A1 Nov. 28, 2019

Related U.S. Application Data

(63) Continuation of application No. 14/224,799, filed on Mar. 25, 2014, now Pat. No. 10,430,856.

(60) Provisional application No. 61/805,293, filed on Mar. 26, 2013.

(51) Int. Cl.
*G06Q 30/00* (2012.01)
*G06Q 30/06* (2012.01)

(52) U.S. Cl.
CPC ................ *G06Q 30/0631* (2013.01)

(58) Field of Classification Search
None
See application file for complete search history.

(56) References Cited

U.S. PATENT DOCUMENTS

| | | | |
|---|---|---|---|
| 2009/0163183 A1* | 6/2009 | O'Donoghue | G06Q 30/02 455/414.1 |
| 2012/0079107 A1 | 3/2012 | Williams | |
| 2012/0095863 A1 | 4/2012 | Schiff | |
| 2012/0117026 A1 | 5/2012 | Cassidy | |
| 2012/0330444 A1* | 12/2012 | Sloan | A63F 13/79 700/92 |

* cited by examiner

*Primary Examiner* — Mila Airapetian
(74) *Attorney, Agent, or Firm* — Alston & Bird LLP

(57) ABSTRACT

Methods and Systems for displaying product recommendations at a virtual storefront by receiving product recommendations from a plurality of heterogeneous sources. The source servers send the product recommendations from their end that are then normalized and refined by a recommendation engine based on a plurality of factors ensuring that the products are presentable and sellable on the storefront. The recommendation collation is accomplished using a pipeline of stateless processors, thereby providing a highly scalable platform perfectly suited for cloud-based computational platforms.

20 Claims, 3 Drawing Sheets

SYSTEMS AND METHODS FOR MARKETPLACE CATALOGUE POPULATION

CROSS-REFERENCE TO RELATED APPLICATION

This application is a continuation of U.S. application Ser. No. 14/224,799, filed Mar. 25, 2014, which claims benefit to U.S. Provisional Patent Application No. 61/805,293, filed on Mar. 26, 2013, the entire contents of each of which are incorporated by reference in their entirety for all purposes.

FIELD OF THE INVENTION

The present disclosure generally relates to online storefronts. Specifically, the disclosure relates to methods and systems for providing product recommendations selected from a group of heterogeneous sources to an online storefront.

BACKGROUND OF THE INVENTION

Online shopping is a form of e-commerce, which allows customers to purchase available products without having to go out of their homes to buy products of their choice. Online shopping also provides geographically distributed vendors to connect with their potentials customers without having to be physically located near them. At present, a large number of online storefronts are available that are creating a global platform for online shopping. These online storefronts allow the users to view a catalogue of products providing them with a wide variety of options to choose from. The transactions also are made through secure encrypted communication pipes, thus, making it secure and comfortable for the customers to shop.

An online storefront requires providing a plurality of products and product recommendations. At present there does not exist a flexible recommendations pattern that accommodates complex topic requests in a scalable manner. Moreover, there does not exist a mechanism for dynamically deriving product recommendations from a plurality of heterogeneous stores and marketplaces and providing the recommendations at a single storefront thereby providing a complete shopping experience to a customer. Hence, there exists a need for a mechanism that enables product recommendations to be derived from a plurality of heterogeneous stores and marketplaces. Moreover, there is a need for a mechanism for normalizing and refining the product recommendations derived from a plurality of distinct stores and marketplaces displaying the product recommendations at an online storefront.

BRIEF SUMMARY OF THE INVENTION

It will be understood that this disclosure is not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

The present disclosure describes receiving and displaying product recommendations at a virtual storefront. The product recommendations may be received from a plurality of heterogeneous sources such as store servers and marketplace server configured distinctly from each other and hence storing product information in various different formats. The store servers and marketplace servers send the product recommendations from their end that are then normalized and refined by the storefront server based on a plurality of factors ensuring that the products are presentable and sellable on the storefront. This is all accomplished using a pipeline of stateless processors, thereby providing a highly scalable platform perfectly suited for cloud-based computational platforms.

DETAILED DESCRIPTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The present invention provides systems and methods for populating marketplace catalogues such as catalogue of a virtual storefront by deriving product recommendations from a plurality of stores and marketplaces and then normalizing the received recommendations that may then be displayed at the virtual storefront. The system and method provide a mechanism for extracting products from plurality of heterogeneous sources and then ensuring that the extracted products are presentable and sellable on a single common platform despite their diverse origins. The present invention also ensures that the product recommendations thus extracted are pertinent to the requirement of the storefront and are compliant with one or more factors determined by the storefront administrator or storefront owner.

Figure 1:
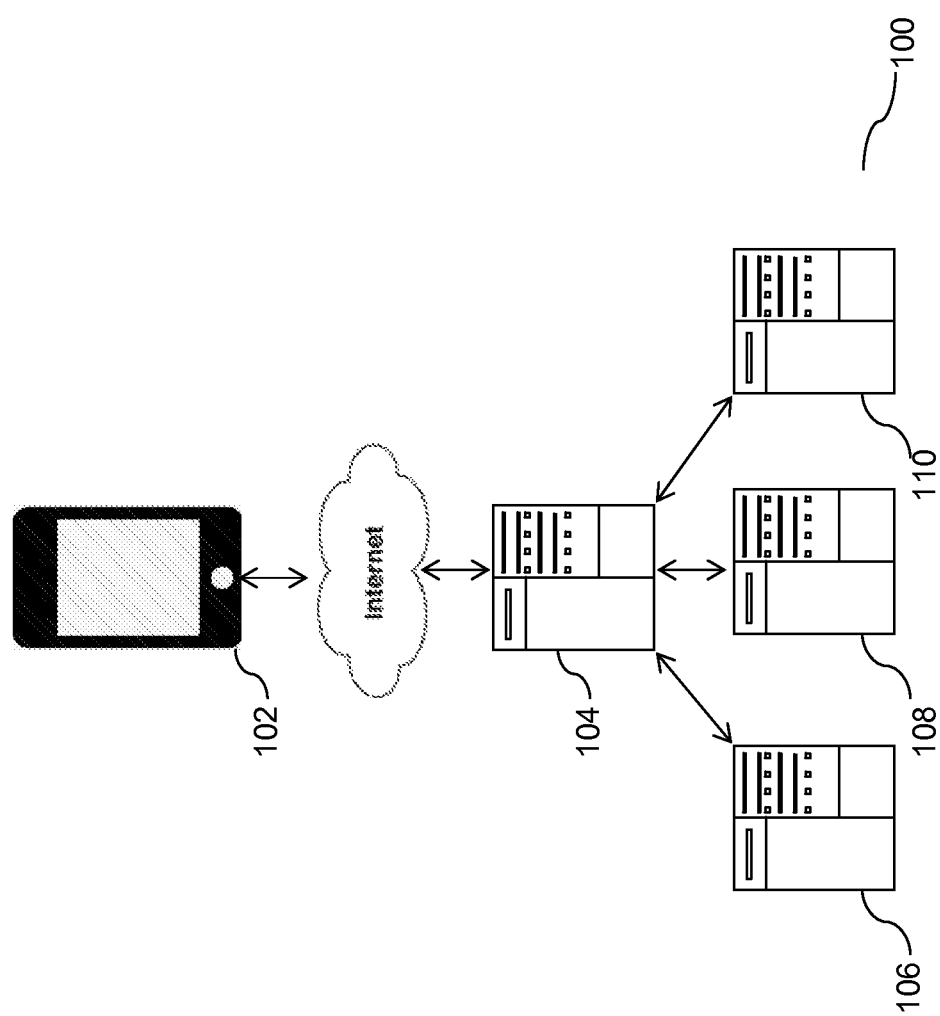
FIG. 1 illustrates a system for populating a marketplace catalogue according to an embodiment.

FIG. 1 illustrates a system (100) for deriving product recommendations from a plurality of sources and displaying one or more product recommendations at the online storefront. The system (100) comprises of a user terminal (102), a storefront server (104), and a plurality of recommendation source servers (106, 108, 110). An online storefront may be accessed by a user using the user terminal (102). The storefront server (104) that is communicatively coupled with the user terminal (102) by means of internet enables the display of the online storefront and based on the user's request may be required to provide product recommendations. In an aspect, the user's request may represent the topic for recommendation such as a keyword related to products required. In another aspect, the user's request may also represent the factors within which the recommendations are required such as products most popular in current month, highest discounted products, and the like. The storefront server (104) is communicatively coupled with one or more recommendation source servers (106, 108, 110). The recommendation source servers (106, 108, 110) may be a store or a marketplace server containing information related to a plurality of products. In an aspect, the recommendation source servers (106, 108, 110) may be specialized recommendation engines facilitating the discovery and mining of product information across several dimensions such as popularity ranking, recency restrictions, and the like. The recommendation source servers (106, 108, 110) may be independent of each other and therefore may be unaware of the recommendations provided by other recommendation source servers. Hence, the product recommendations received by the storefront server (104) from the recommendation source servers (106, 108, 110) may differ with regards to one or more factors such as recommendation structure, product information format, and may also have duplicity. The storefront server (104) upon receiving the product recommendations from the recommendation source servers (106, 108, 110) may then normalize and refine the recommendations before displaying them at the storefront.

In an embodiment, the storefront server (104) may comprise of one or more adapters that are configured for extracting product information from the heterogeneous recommendation sources. In an aspect, the adapter in the storefront server (104) may have a one-to-one relation with the source server. The storefront server (104) may further comprise of one or more normalization engines that transform the various recommendations received in heterogeneous formats to a normalized format. The normalized recommendations may then be further refined by means of one or more refining processors. The one or more normalization engines and one or more refining processors may be layered within the recommendation pipeline wherein each processor node layer executes a specific logic. In an aspect, the normalization and refining processors are stateless and are independent of external states as well session context. This allows these processors to be auto-provisioned and, if needed, auto-resumed without loss of data. In an aspect, multiple recommendation processes may be executed in parallel, each one occupying a layer of the pipeline, thereby serving a plurality of recommendation requests from a plurality of users. In an aspect, multiple pipelines may be auto-provisioned, thereby serving a plurality of recommendation requests from a plurality of storefronts.

Figure 2:
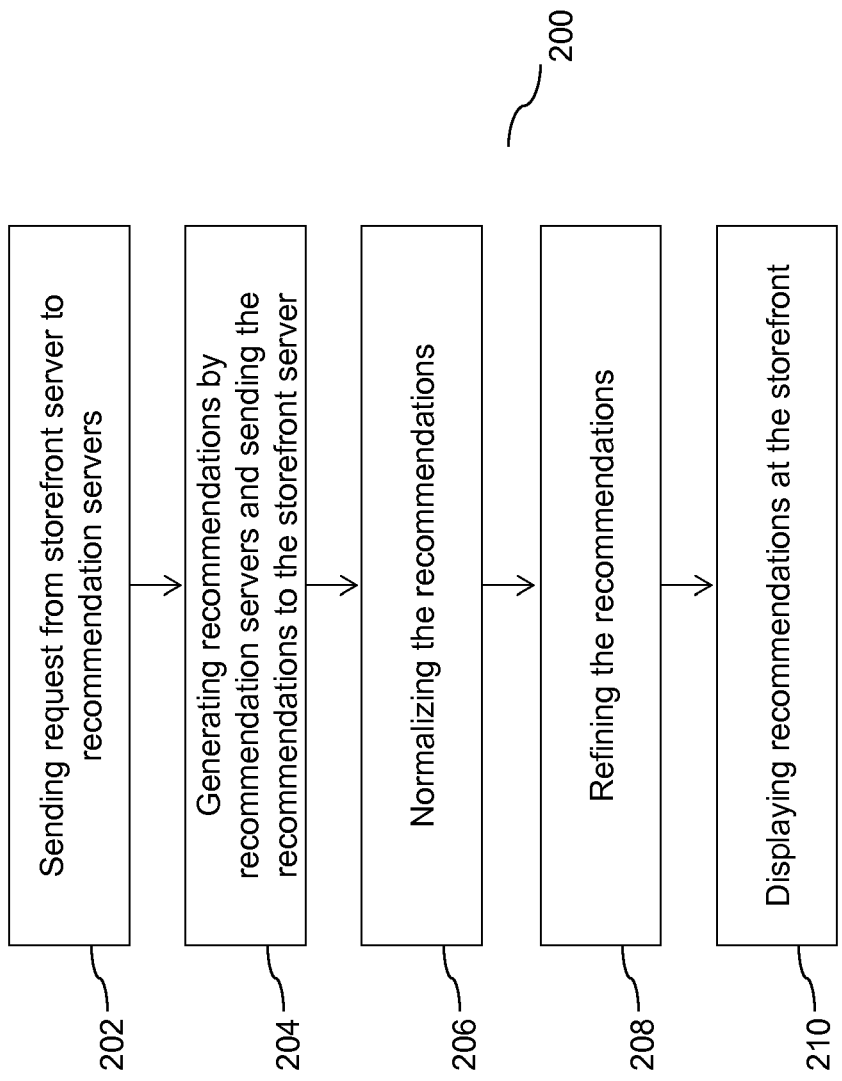
FIG. 2 illustrates a flow chart of a method for deriving product recommendations from a plurality of heterogeneous stores and marketplaces and normalizing the received recommendations according to an embodiment.

FIG. 2 illustrates a flow chart of a method (200) for deriving product recommendations from a plurality of heterogeneous stores and marketplaces and normalizing the received recommendations according an embodiment. At step (202) a recommendation request is sent from the storefront server to the one or more recommendation source servers. In an aspect, the storefront's request may represent the topic for recommendation such as a set of keywords related to products required. In another aspect, the storefront's request may also represent the factors within which the recommendations are required such as products most popular in current month, highest discounted products, and the like. The request may be formatted to specific formats relevant to individual recommendation source servers.

Once a recommendation request is received by a recommendation source server, at step (204) it generates product recommendations based on the request received and then sends the recommendation to the storefront server.

The storefront server after receiving the recommendations from the heterogeneous recommendation servers normalizes (206) the recommendation to a canonical/normalized format. The heterogeneous recommendations are individually formatted from the source format to the normalized format. In an aspect, the normalization of recommendations may be dependent on the format of the recommendation source as well as the procedure through which the recommendations are delivered. The normalization step (206) may further comprise of a plurality of sub steps such as semantic formatting, syntactic formatting, structural transformation, and the like. The normalization step creates a set of recommendations that have a fixed normative format that may be utilized for further processing. In an aspect, the normative format of the recommendations may evolve as more and more recommendation sources are introduced in the system. In an embodiment, the normalization step (206) may involve detecting the name of the product recommended by the source and replacing the name of the product by a canonical field name found in the normative format dictionary. The normalization step (206) allows various heterogeneous recommendation sources to be utilized irrespective of the format used by the source.

The normalized recommendations are then refined (208). The step of refining the recommendations may comprise of one or more hierarchical sub-steps. In an aspect, the step of refining may comprise of eliminating duplicate product recommendations based on product detail comparison or the canonical field name comparison. In another aspect, the recommendations may be refined based on one or more factors related to the user and/or one or more factors related to the source. For example, a recommendation provided by a source related to a vendor originating in a different location than the user's geographical location may be deleted. In another aspect, the process of refining the recommendations may sort the recommendations based on vendor specific factors. Refinement may be accomplished through the use of stateless refining processors layered according to refinement logic. Within each layer, subsets of recommendations may be fed to individual processors and these individual processors may apply the refinement logic to each such subgroup, sending the results to a merging layer or another refinement layer. Within each refinement layer, one or more stateless refining processors may be auto-provisioned, allowing for the consumption of large amounts of products originating from the source vendors and/or marketplaces. In between refinement layers, intermediate results may be cached to allow for an asynchronous resumption of the refinement pipeline.

Ultimately, one product recommendation list is derived that is in a format suitable for the online storefront and such product recommendation list is displayed (210) at the storefront in response to the user's topical recommendation request.

For example, a user may request for product recommendations for a weighing machine via the storefront to the storefront server. Upon receiving the request the storefront server may connect or call to one or more source servers that may be configured using different platforms such as a first source may provide product recommendations in JSON format, second source may provide recommendations in Java SDK format, and a third source may produce recommendation in XML format. The normalization step may then semantically normalize the recommendations in different formats to a normative format such as java beans. Upon normalization, the recommendations are refined such as the different sources may have provided certain similar recommendations that are deleted in the refining step for eliminating duplicity. The refining step may further comprise of one or more sub-steps such as ranking the recommendation according to a specific ranking algorithm such as ranking based on the source attributes, ranking based on the semantic tag affinity of the original recommendation keyword provided by the user, and the like. Such a refinement may then lead to a product recommendation list that is displayed in the online storefront.

Figure 3:
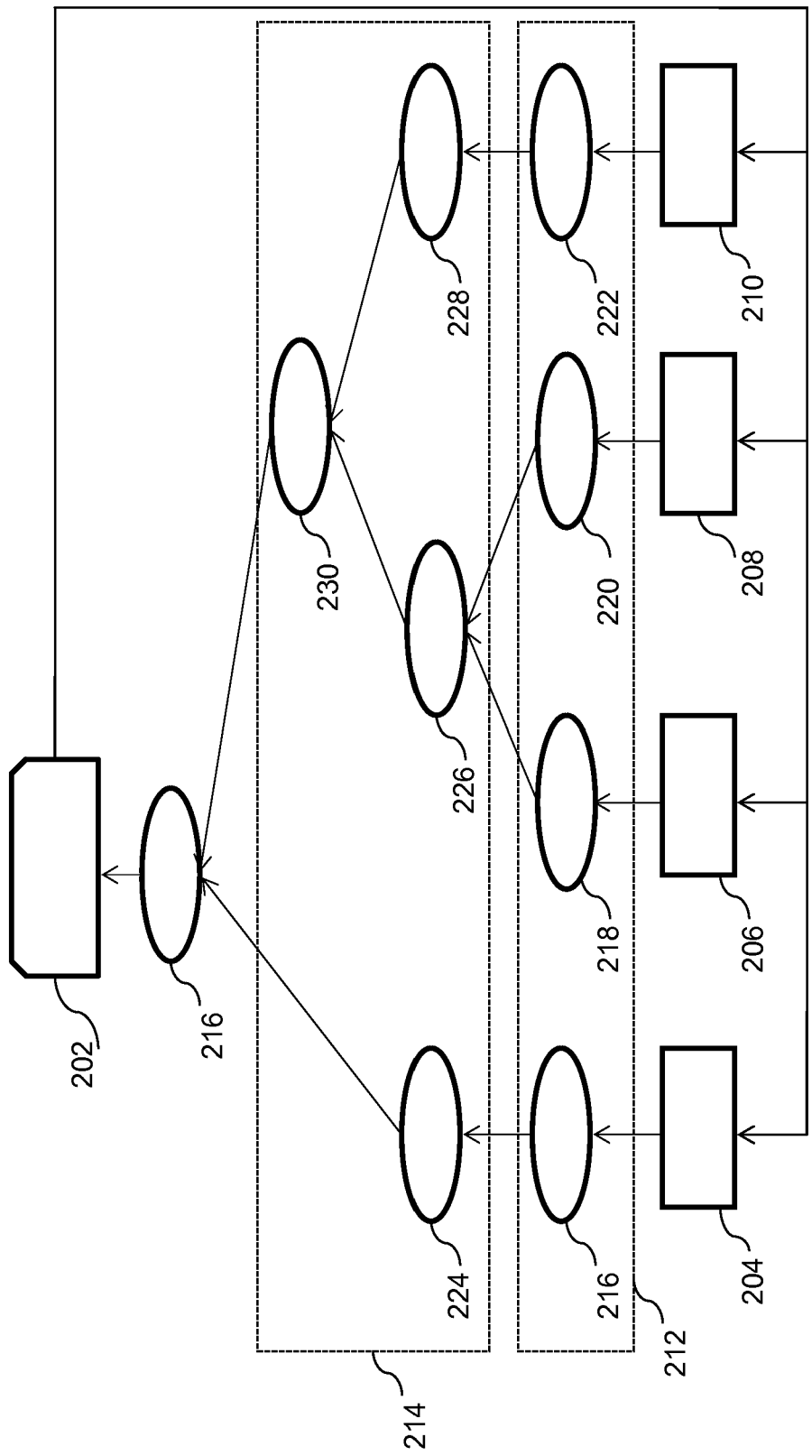
FIG. 3 depicts a block diagram illustrating a layered structure for marketplace catalogue population.

FIG. 3 depicts a block diagram illustrating the layered structure for implementing the system and method for marketplace catalogue population according to an embodiment. The method or system for marketplace catalogue population may include sourcing recommendations from a plurality of heterogeneous sources. Structurally, normalization and refinement steps are facilitated by a plurality of processor nodes. In an embodiment, a storefront (202) may be coupled to a plurality of vendors, stores and marketplaces, and specific recommendation engines (204, 206, 208, 210). The vendors, stores, marketplaces and recommendation engines (204, 206, 208, 210) act as the source for providing recommendations as they store information regarding a plurality of products. The system may include one or more adapters for extracting product information from recommendation sources. Once the recommendation sources receive a recommendation request they may generate one or more product recommendations based on the request and the products available. The recommendations generated by the recommendations sources being generated by heterogeneous sources have heterogeneous syntactic and semantic attributes. For example, source (204) may provide product recommendations in JSON format, source (206) may provide recommendations in Java object format, and the sources (208 and 210) may produce recommendations in XML format. The system may include one or more normalization engines (214) for transforming the recommendations received from heterogeneous sources to a common normalized format for further processing. Upon normalization of the recommendations one or more refining processes may need to be carried out such as sorting, duplicate elimination, removal of sub-par results, application of recommendation source weighting, and the like. The system may comprise of one or more refining processors for refining the normalized recommendations. The refining processors receive the normalized recommendations and refine the recommendations in one or more stages to result into a normalized recommendation list that may then be displayed at the storefront (202). Refinement is accomplished through the use of stateless refining processors layered according to refinement logic. Within each layer, subsets of recommendations are fed to individual processors and these individual processors apply the refinement logic to each such subgroup, sending the results to a merging layer or another refinement layer. Within each refinement layer, stateless refining processors are auto-provisioned as needed, allowing for the consumption of large amounts of products originating from the source vendors and/or marketplaces. In between refinement layers, intermediate results are persisted/cached to allow for asynchronous resumption of the refinement pipeline. Finally, upon the completion of multi-step refining a single product list (216) is generated by merging the refined recommendations that is then displayed at the storefront (202).

The one or more normalization engines and one or more refining processors are layered within a recommendation pipeline wherein each processor node layer executes a specific logic. In an aspect, the normalization and refining processors are stateless and are independent of external states as well session context. This allows these processors to be auto-provisioned and, if needed, auto-resumed without loss of data. In an aspect, multiple recommendation processes may be executed in parallel, each one occupying a layer of the pipeline, thereby serving a plurality of recommendation requests from a plurality of users. In an aspect, multiple pipelines may be auto-provisioned, thereby serving a plurality of recommendation requests from a plurality of storefronts.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

While for purposes of simplicity of explanation, the illustrated methodologies are shown and described as a series of blocks/steps, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

The preceding description has been presented with reference to various embodiments. Persons skilled in the art and technology to which this application pertains will appreciate that alterations and changes in the described structures and methods of operation can be practiced without meaningfully departing from the principle, spirit and scope.

What we claim is:

1. A system comprising:
a virtual storefront comprising one or more servers, the virtual storefront configured to maintain a product listing, the virtual storefront configured to be in communication with one or more heterogenous recommendation sources and one or more user terminals, wherein the virtual storefront is further configured to:
receive, from at least one of the one or more user terminals, one or more recommendation requests,
provide, to at least one of the one or more heterogeneous recommendation sources, at least one of the one or more recommendation requests,
receive, from the at least one of the one or more heterogeneous recommendation sources, in response to the at least one of the one or more recommendation requests, one or more product recommendations, wherein at least one of the one or more product recommendations comprise one or more heterogeneous formats,
normalize the at least one product recommendations comprising the one or more heterogenous formats to form a normalized one or more product recommendations,
refine the normalized one or more product recommendations to form one or more refined product recommendations, and
in an instance in which the product listing at the virtual storefront is missing at least one of the one or more refined product recommendations, modify the product listing maintained by the virtual storefront according to the one or more refined product recommendations.

2. The system of claim 1, wherein the virtual storefront comprises a recommendation pipeline configured to carry out the normalization, the recommendation pipeline comprising one or more layers.

3. The system of claim 2, wherein each of the one or more layers are configured to carry out at least part of the normalization of the at least one of the one or more product recommendations.

4. The system of claim 3, wherein each layer of the one or more layers comprise one or more stateless processor nodes, each stateless processor node being configured to be auto-provisioned at the layer-level without loss of data.

5. The system of claim 4, wherein the one or more layers of the recommendation pipeline are asynchronous.

6. The system of claim 5, wherein the recommendation pipeline comprises more than one layer, each layer of the more than one layer being configured to be auto-provisioned asynchronously to normalize the at least one product recommendations.

7. The system of claim 1, wherein each of the one or more recommendation requests comprise at least one from among: a keyword related to the plurality of products, a product popularity ranking, a recency restriction, and a discount rate.

8. The system of claim 1, wherein the virtual storefront is configured to normalize the at least one of the one or more product recommendations comprising one or more hetero-geneous formats by changing one or more of: a field, a field type, a field name, an absence or presence of a field, a scripting language, or a semantic tag.

9. A method comprising:
receiving, at a virtual storefront comprising one or more servers, from one or more user terminals, one or more recommendation requests, wherein the virtual storefront is configured to maintain a product listing;
providing, by the virtual storefront, to one or more heterogeneous recommendation sources, at least one of the one or more recommendation requests;
receiving, at the virtual storefront, from at least one of the one or more heterogeneous recommendation sources, in response to the at least one of the one or more recommendation requests, one or more product recommendations, wherein at least one of the one or more product recommendations comprise one or more heterogeneous formats;
normalizing the at least one product recommendations comprising the one or more heterogeneous formats to form a normalized one or more product recommendations;
refining the normalized one or more product recommendations to form one or more refined product recommendations; and
in an instance in which the product listing at the virtual storefront is missing at least one of the one or more refined product recommendations, modifying the product listing maintained by the virtual storefront according to the one or more refined product recommendations.

10. The method of claim 9, wherein at least one of the one or more recommendation requests comprises at least one from among: a keyword, a popularity ranking, a recency restriction, or a discount rate.

11. The method of claim 9, wherein said normalizing comprises normalizing the at least one of the one or more product recommendations comprising one or more heterogeneous formats by changing one or more of: content of a field, a field type, a field name, or an absence or presence of a field.

12. The method of claim 9, wherein said normalizing comprises normalizing the at least one of the one or more product recommendations comprising one or more heterogeneous formats by changing a scripting language.

13. The method of claim 9, wherein said normalizing comprises normalizing the at least one of the one or more product recommendations comprising one or more heterogeneous formats by changing a semantic tag.

14. The method of claim 11, wherein the at least one of the one or more product recommendations comprises a field associated with one or more factors, wherein the one or more factors comprise one or more of: a product name, a product type, a product category, or a product description.

15. The method of claim 11, wherein the at least one of the one or more product recommendations comprises a field associated with one or more factors, wherein the one or more factors comprise one or more of a price a discount rate.

16. The method of claim 11, wherein the at least one of the one or more product recommendations comprises a field associated with one or more factors, wherein the one or more factors comprise one or more of: a popularity score, a ranking, or one or more recency restrictions.

17. The method of claim 11, wherein the at least one of the one or more product recommendations comprises a field associated with one or more factors, wherein the one or more factors comprise a geographic location of the respective recommendation source.

18. The method of claim 11, wherein said normalizing comprises normalizing the at least one of the one or more product recommendations by comparing one or more fields of the at least one of the one or more product recommendations to a normative format.

19. The method of claim 10, wherein said normalizing comprises normalizing the at least one of the one or more product recommendations according to a dynamic normative format.

20. A non-transitory computer-readable storage medium having computer-readable program instructions stored therein, the computer-readable program instructions configured to cause:

receiving, at a virtual storefront comprising one or more servers, from one or more user terminals, one or more recommendation requests, wherein the virtual storefront is configured to maintain a product listing;

providing, by the virtual storefront, to one or more heterogeneous recommendation sources, at least one of the one or more recommendation requests;

receiving, at the virtual storefront, from at least one of the one or more heterogeneous recommendation sources, in response to the at least one of the one or more recommendation requests, one or more product recommendations, wherein at least one of the one or more product recommendations comprise one or more heterogeneous formats;

normalizing the at least one product recommendations comprising the one or more heterogenous formats to form a normalized one or more product recommendations, refining the normalized one or more product recommendations to form one or more refined product recommendations, and in an instance in which the product listing at the virtual storefront is missing at least one of the one or more refined product recommendations, modifying the product listing maintained by the virtual storefront according to the one or more refined product recommendations.

* * * * *